Patented Apr. 22, 1930

1,755,648

UNITED STATES PATENT OFFICE

FRANZ HENLE AND BARTHOLOMÄUS VOSSEN, OF HOCHST-ON-THE-MAIN, GERMANY, ASSIGNORS TO GENERAL ANILINE WORKS, INC., OF NEW YORK, N. Y., A CORPORATION OF DELAWARE

6-CHLORO-2-AMINO-1-METHYLBENZENE-4-SULPHONIC ACID

No Drawing. Original application filed August 24, 1925, Serial No. 52,216, and in Germany September 1, 1924. Divided and this application filed June 6, 1928. Serial No. 283,453.

The present invention relates to 6-chloro-2-amino-1-methylbenzene-4-sulphonic acid of the formula:

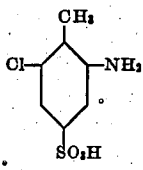

This application is a division of our copending U. S. patent application Ser. No. 52,216 filed August 24, 1925.

We have found that 6-chloro-2-nitro-1-methylbenzene-4-sulphonic acid is obtained by treating 6-chloro-2-nitro-1-methylbenzene with sulfuric acid containing sulfuric acid anhydride. The reaction product thus obtainable consists almost completely of 6-chloro-2-nitro-1-methylbenzene-4-sulphonic acid. By reducing the named acid in the usual manner, the hitherto unknown 6-chloro-2-amino-1-methylbenzene-4-sulphonic acid is obtained in a state free from isomerides.

The constitution of the said 6-chloro-2-amino-1-methylbenzene-4-sulphonic acid can be positively determined by the elimination of the amino group and transformation into the known 2-chloro-1-methylbenzene-4-sulphonic acid, and by the substitution of chlorine for the amino group, whereby the known 2.6-dichloro-1-methylbenzene-4-sulphonic acid is produced.

We have furthermore found that one may use in our process as starting materials a mixture of 6-chloro-2-nitro-1-methylbenzene and 4-chloro-2-nitro-1-methylbenzene as it is for instance industrially produced by chlorinating 2-nitro-1-methylbenzene. We have found that the sulphonation of the 6-chloro-2-nitro-1-methylbenzene occurs more easily than that of 4-chloro-2-nitro-1-methylbenzene and that it is possible to carry out the sulphonation process under such conditions that a sulphonation of the 6-chloro-2-nitro-1-methylbenzene is effected whereas the 4-chloro-2-nitro-1-methylbenzene remains unaltered.

The above mentioned fact offers at the same time a new method of separating the 6-chloro-2-nitro-1-methylbenzene from the 4-chloro-2-nitro-1-methylbenzene which separation could hitherto be effected only by fractional distillation.

It is particularly advantageous to subject to sulphonation the mixture of 6-chloro-2-nitro-1-methylbenzene and 4-chloro-2-nitro-1-methylbenzene which is produced during the fractional distillation as a scarcely separable middle fraction; by partial sulphonation the 4-chloro-2-nitro-1-methylbenzene is isolated almost completely in a technically pure state, whereas the 6-chloro-2-nitro-1-methylbenzene is converted into the 6-chloro-2-nitro-1-methylbenzene-4-sulphonic acid.

A further object of our present invention is the particular method of separating the sulphonated portion from the non-sulphonated portion. We have made the observation that it is not at all possible to separate in a satisfactory manner the unaltered 4-chloro-2-nitro-1-methylbenzene from the dissolved 6-chloro-2-nitro-1-methylbenzene-4-sulphonic acid by pouring the sulphonation mixture into water, because the diluted sulfuric acid causes a great part of the non-sulphonated, oily 4-chloro-2-nitro-1-methylbenzene to be suspended and even dissolved. When on the contrary the sodium 6-chloro-2-nitro-1-methylbenzene-4-sulphonate is directly salted out, the non-sulphonated 4-chloro-2-nitro-1-methylbenzene is enclosed by the formed crystals, which renders a mechanical separation impracticable.

The separation of the two substances in question can, however, be effected by carrying out the salting-out operation in two stages namely by first adding only so much common salt that the sodium 6-chloro-2-nitro-1-methylbenzene-4-sulphonate is not yet salted out, whereas the non-sulphonated 4-chloro-2-nitro-1-methylbenzene is thereby practically almost completely removed from its suspension or solution. It is only after the isolation of the non-sulphonated, oily 4-chloro-2-nitro-1-methylbenzene which can now be easily effected that the sodium salt of the 6-chloro-2-nitro-1-methylbenzene-4-sulphonic acid is salted out by a further addition of common salt. Also in this case there are still left 2% of 4-chloro-2-nitro-1-methylbenzene in the separated sodium salt of the 6-chloro-2-nitro-1-methylbenzene-4-sulphonic acid; this remainder can, if required, be removed very easily by distillation with steam, if the mass is previously rendered slightly alkaline with sodium carbonate.

The following example illustrates our invention, the parts being by weight:

Into 4287 parts of the technical mixture of about equal parts of 6-chloro-2-nitro-1-methylbenzene and 4-chloro-2-nitro-1-methylbenzene are run at 75–80°C., while stirring, 6000 parts of oleum of 20% strength. The mixture is stirred for another 7–8 hours at the same temperature. The sulphonated mixture is then introduced into a solution of 2500 parts of common salt in 40000 parts of water, care being taken to maintain a temperature of 80° C. which must however not be exceeded. The resulting mass is stirred for sometime and the non-sulphonated, oily 4-chloro-2-nitro-1-methylbenzene is then allowed to separate; it is then separated by draining off whereupon to the acid aqueous solution are further added, while stirring, 9000 parts of common salt. After cooling, the isolated sodium salt of the 6-chloro-2-nitro-1-methylbenzene-4-sulphonic acid is filtered by suction.

The yield of 6-chloro-2-nitro-1-methylbenzene-4-sulphonate of sodium thus separated amounts to more than 70% of theory with regard to the original percentage of 6-chloro-2-nitro-1-methylbenzene. The yield of unaltered 4-chloro-2-nitro-1-methylbenzene is almost quantitative with regard to the original percentage of 4-chloro-2-nitro-1-methylbenzene.

By reducing the 6-chloro-2-nitro-1-methylbenzene-4-sulphonic acid to 6-chloro-2-amino-1-methylbenzene-4-sulphonic acid by the usual methods almost quantitative yields are obtained.

The 6-chloro-2-amino-1-methylbenzene-4-sulphonic acid is a whitish-gray powder, which is sparingly soluble in cold water, readily soluble in hot water. It is soluble in concentrated sulfuric acid to a yellowish solution from which it is reprecipitated on dilution with water.

By deaminating the acid, the 6-chloro-1-methylbenzene-4-sulphonic acid is obtained the chloride of which melts at 36° C., the amide at 136° C. and the anilide at 94° C.

By substituting chlorine for the amino group according to Sandmeyer's process, the 2.6-dichloro-1-methylbenzene-4-sulphonic acid is obtained, the chloride of which melts at 67° C., the amide at 189° C. and the anilide at 167° C.

The separating process as above described is independent within wide limits of the quantitative proportion of the two isomerides; except that in case of the proportion of 6-chloro-2-nitro-1-methylbenzene to the 4-chloro-2-nitro-1-methylbenzene in the mixture to be separated being greater than that in the foregoing example, the respective quantities of oleum and common salt must be adequately increased.

We claim:

As a new product, the 6-chloro-2-amino-1-methylbenzene-4-sulphonic acid of the formula:

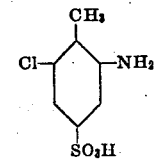

being a whitish gray powder, sparingly soluble in cold water, readily soluble in hot water and soluble in concentrated sulfuric acid to a yellowish solution.

In testimony whereof, we affix our signatures.

FRANZ HENLE.
BARTHOLOMÄUS VOSSEN.